United States Patent [19]
Baermann

[11] 3,723,795
[45] Mar. 27, 1973

[54] EDDY-CURRENT AND HYSTERESIS BRAKE FOR TRACK-BOUND VEHICLES

[76] Inventor: Max Baermann, 506 Bensherg Wulfshof, Bezirk, Cologne, Germany

[22] Filed: July 12, 1971

[21] Appl. No.: 161,609

[52] U.S. Cl. .................. 310/93, 105/77, 188/165
[51] Int. Cl. .......................................... H02k 49/00
[58] Field of Search ..... 310/93; 105/77, 78; 188/164, 188/165

[56] References Cited

UNITED STATES PATENTS

| | | | |
|---|---|---|---|
| 1,898,555 | 2/1933 | McCune | 105/77 |
| 3,506,862 | 4/1970 | Nomura | 310/93 |
| 2,054,716 | 9/1936 | Stedefeld et al. | 188/165 |

FOREIGN PATENTS OR APPLICATIONS

1,164,307   5/1958   France .................. 188/165

Primary Examiner—Donovan F. Duggan
Attorney—James H. Tilberry et al.

[57] ABSTRACT

A novel eddy-current and hysteresis brake for track-bound vehicles is provided which incorporates resisting skids or rollers to eliminate wear problems associated with prior art brakes of this type. The particular magnetic construction of the pole surface is critical to obtain maximum hysteresis and eddy-current forces with a uniform air gap and the minimum energization. The pole surface is also formed to prevent undesirable air currents or the accumulation of dirt or other disturbing external build-up, while providing maximum pole surface and winding relationships. An alternating pole configuration is provided along the direction of movement of the vehicle.

12 Claims, 13 Drawing Figures

Patented March 27, 1973 3,723,795

INVENTOR.
MAX BAERMANN
BY
Meyer, Tilberry & Body
ATTORNEYS

Patented March 27, 1973

INVENTOR.
MAX BAERMANN
BY
Meyer, Tilberry & Body
ATTORNEYS

Patented March 27, 1973

INVENTOR.
MAX BAERMANN
BY
Meyer, Tilberry & Body
ATTORNEYS

Fig. 12

INVENTOR
MAX BAERMANN

BY Meyer, Tilberry & Body
ATTORNEYS

EDDY-CURRENT AND HYSTERESIS BRAKE FOR TRACK-BOUND VEHICLES

For braking track-bound vehicles, magnetic brakes have become known, wherein mostly electromagnets are used, the pole shoes of which are designed as fast-wearing parts. By magnetic attraction, these pole shoes are pressed against the ferromagnetic track so that the resulting friction is exploited for braking. In this construction, the pole shoes as well as the track are subject to considerable wear. Moreover, the braking effect decreases in case of high speeds and also depends on the dirt accumulation on the track and weather conditions.

German Pat. No. 1,123,359 describes a permanent magnet brake for track-bound vehicles, wherein a braking effect is achieved partly by friction and partly by a considerable number of poles of alternating polarity arranged in the direction of motion whereby eddy-current and hysteresis losses are produced in the track, which increase the braking effect. In case of high speeds due to the resulting eddy currents, the braking effect is improved. But the brakes of this German application are still subject to considerable wear.

For avoiding these disadvantages, already wear-resisting eddy-current and hysteresis brakes for high-speed track-bound vehicles have become known, which brakes have electromagnetically-energized poles, the pole surfaces of which face the track with intermediate air gaps for producing the eddy currents. With these known eddy-current brakes for track-bound vehicles, satisfactory braking effects could not be achieved.

In track-bound vehicles, the space available for the brakes is limited and the shape of the upper part of the track is unfavorable for the generation of eddy currents and heretofore, sufficient braking forces could not be achieved by means of the known brakes. As there is a tendency towards steadily increasing the speed of track-bound vehicles, there is an urgent need for creating a wear-resisting brake for track-bound vehicles, which in case of high speeds of more than 200 km/h develop high braking forces so that a safe braking of the track-bound vehicles with the shortest possible braking distance can be achieved.

The present invention contemplates a practically useful eddy-current and hysteresis brake for track-bound vehicles which with a relatively short overall length produces high braking so that an effective braking of the track-bound vehicle even with today's high speeds is guaranteed.

In accordance with the invention, an eddy-current and hysteresis brake for track-bound vehicles is provided having a magnetic system composed of an iron core of several branches, the individual branches being joined by means of a yoke, and electric energizing coils on the individual branches wherein part of the pole branch protrudes from the winding to form a pole head and wherein the thickness of the part of the pole branch surrounded by the winding measured in the direction of motion is at most equal to the thickness of the pole head and the distance from center to center of two neighboring pole branches is 45 mm ± 15 mm (whereby the thickness of a pole head measured in the direction of motion is at least 16 mm) and that spacing devices have been provided granting a nearly constant air gap between the pole surfaces and the parts in which eddy currents and hysteresis losses to effect braking action are produced.

According to the invention, it is surprisingly possible to achieve braking forces which are higher and more uniform than those of the common friction brakes and magnetic brakes of equal external dimensions. Also, these braking forces can be safely maintained even over a wide range of speeds. Therefore, the friction brakes used for standstill braking need only be small brake blocks which are subject to very little wear because the main part of the whole braking work is done by the eddy-current brakes.

I have found that the shape of the profile of the upper part of the track, which is unfavorable for the generation of eddy currents, requires a special design of the pole arrangement differing from the common construction. While it has heretofore been common practice to make the pole surface in the direction of motion relatively wide, according to the invention, a pole arrangement is suggested, wherein the poles in the direction of motion are relatively narrow and the distance from pole center to pole center has been so selected that under consideration of the space required by the windings, most favorable braking forces per unit of length are the result.

Due to the spacing devices suggested by the invention, it is possible to maintain an air gap which is adequate to cooperate with the particular vehicle and track configuration. On one hand, the air gap should be as small as possible, for the wider the air gap is, the more ampere windings must be applied in order to obtain a high flux density inside the air gap; on the other hand, in view of the rough nature of most rails for trains, the air gap must be wide enough that a smooth operation is guaranteed.

For obtaining the necessary space for the windings in case of narrow-spaced poles, in an advantageous embodiment of the invention, the part of the branch surrounded by the winding measured in the direction of motion is made thinner than the pole head. In order that the cross section of the branch part penetrated by the magnetic flux is at least equal to the cross section of the pole head, the branch part surrounded by the winding is made wider, measured transversely to the direction of motion. Using these dimensional relationships, it is possible to accommodate the necessary ampere windings for producing an air gap flux of 15,000 to 20,000 Gauss (measured during standstill) in a body of relatively small overall length.

Moreover, I have found that the cross section of the pole heads passed through by the magnetic flux should be so big that it amounts to more than 25 percent, preferably 35 to 40 percent of the cross section of the upper part of the track. By this dimension of the pole head surface in proportion to the cross section of the upper part of the track, I have found that the lines of magnetic force penetrate relatively deeply into the upper part of the track, which causes the generation of strong eddy currents so that the braking force is further improved. At the same time, I have found that even with a lateral swinging of the track-bound vehicle, a constant braking force is maintained.

If the eddy-current and hysteresis brakes according to the invention are attached to non-resiliently mounted parts of the vehicle frame, their movement towards the track is limited by means of stops in order that a constant air gap is maintained when the brake is switched on.

During braking, the pole surfaces are moved over unevennesses such as turnouts, crossing, and the like. To avoid having these pole surfaces contacted and during such movement damaged, the ends of the brake have been provided with skids made of wear-resisting material and protruding beyond the pole surfaces toward the track.

If relatively big air gaps are provided, a correspondingly larger excitation of the coils is necessary for achieving the required flux density. In case of smaller air gaps and therefore lower excitation of the coils, it is appropriate to provide the brake itself with supporting wheels in order to guarantee that an exact small air gap is maintained. Apart from the supporting wheels, the design of the skid-shaped ends is maintained. I have found that it is advantageous to arrange the supporting wheels in a way that they protrude so much beyond the pole surfaces of the magnets facing the track that the necessary air gap is maintained, and the additional wear-resisting skids stand back with their sliding surface with respect to the treads of the supporting wheels, but stand out with respect to the pole surfaces of the magnets. In case of an unevenness due to this design, first the sliding surface of the wear-resisting skids will slide on the track thus protecting the pole surfaces. Normally, however, also the wear-resisting skids are protected during braking, because the supporting wheels provide for a strict maintenance of the desired air gap.

The electromagnetically-energized poles exercise an attraction on the track so that in case of reduced driving speed an unduly high bearing load can occur. In case of high speeds, this attraction is, during braking, considerably reduced by the eddy currents produced in the track which oppose the attraction. In case of low speeds, however, the counter-force produced by the eddy currents rapidly decreases so that care must be taken to avoid that due to the attraction of the magnets, the bearing load of the wheels is unduly increased to high values. For this reason, control and/or cut-out means have been provided, with which the energized current is so controlled that in case of reduced driving speed, the resulting attraction does not surpass the allowable bearing load.

As the wheel flange with respect to its width as well as in radial direction has similar dimensions as the tread of the track, it is also possible that the brakes according to the invention influence the wheel flanges, because the peripheral speed of the wheels corresponds to the driving speed. It is of special advantage to arrange the brakes on both sides of the wheel flange so that their pole surfaces face the wheel flange, whereby the yoke carrying the branches is of ring segment shape. By this arrangement, it is possible to avoid the wear and noise of conventional block brakes and to achieve the special advantage that the wheel flange is evenly heated, so that in case of wheels having shrunked-on tires, no loosening occurs. Moreover, in case of a double arrangement of brakes on one wheel set, the attraction forces cancel each other out.

Depending on the given construction of the vehicle frame in this design, it is of advantage to fasten the brakes to the spring-mounted parts, because in this position, they are not exposed to any vibrations.

Also, of course, an arrangement can be selected, wherein several brake units influence the track as well as the flanges of the wheels.

It is advisable to use a strip conductor for the energizing winding on the pole branches. Preferably, the energizing winding is so designed that it can be operated with low voltage and high currents so that the insulation between the individual windings can be of small thickness. It is of advantage to produce the electric current for excitation by means of a generator driven by the rotating parts of the track-bound vehicle. For this purpose, an AC or a three-phase generator can be used, whereby for rectifying the energizing current in a known way, rectifiers have been arranged between the generator and the eddy-current brake. The excitation of the generator can be effected by permanent magnets or an electromagentically-energized winding, the exciting current of which is taken from the vehicle battery. In the latter case, a sensitive control of the energizing current is possible and desirable.

The generator provided for producing the energizing current can, with advantage, be so designed that its characteristic curve showing the relationship between the produced energizing current and the speed decreases to zero, when the speed is under 60 km/h.

For producing the energizing current, a generator is most appropriate, the stator of which is composed of two pole rings arranged at some distance from each other, which for control and adjustment of the energizing current can be turned by one pole pitch relative to each other. Such a generator is described in the U. S. Pat. application, Ser. No. 853,764 which is now abandoned in favor of continuation application Ser. No. 153,785 filed June 16, 1971. The two pole rings can be turned by pneumatic, hydraulic, or any suitable means. U.S. Pat. application Ser. Nos. 853,764 and 153,785 are owned by the same individual as the present application and have the same sole inventor as the present application. Application Ser. No. 153,785 is still pending before the U.S. Pat. Office.

Further, the invention contemplates that the generator of application Ser. No. 853,764 which is now abandoned in favor of continuation application Ser. No. 153,785 filed June 16, 1971, can be used to maintain the induced energizing current automatically at a constant value. Since induced currents are aligned according to the Lenz principle, they tend to impede the motion of the conductors due to the interaction existing between the current-carrying conductors and the magnet. This principle can be used in the generator by connecting one of the two torsional pole rings of the stator with a means generating a counter force, such as a spring. Hence, when the energizing current increases, it will attempt (according to the Lenz principle) to move this particular pole ring against the force of the spring. Some movement by a certain angular amount will occur, which however causes a reduction of the induced current because the poles are angular displaced from each other. A state of equilibrium is reached which essentially corresponds to the force of the spring, and in this way the energizing current will not exceed a certain predetermined peak value. In this way, it is possible to provide an automatic control of the energizing current up to a predetermined maximum value.

A generator of this design guarantees a safe switching on and off of these high-energizing currents and avoids line interruptions, switching sparks, and contact consumption.

Below, in accordance with the patent statutes, the preferred embodiments of the invention will be explained by means of the drawings.

Figure 1:
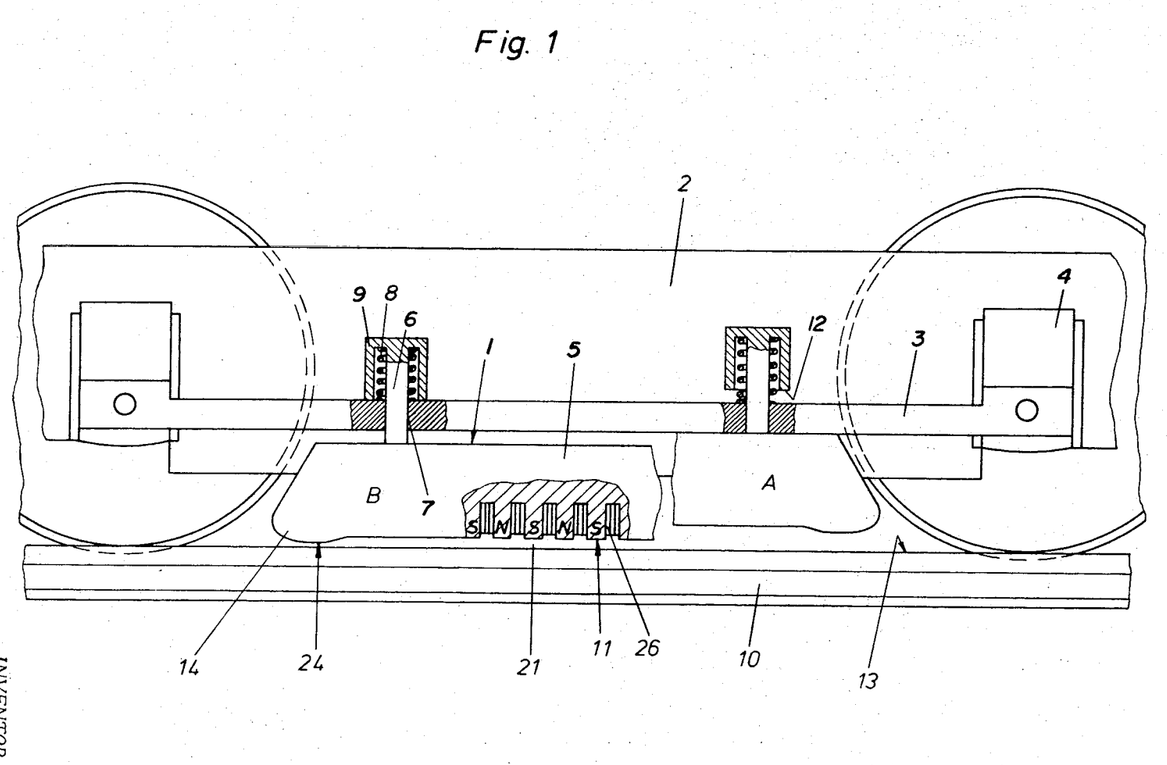
FIG. 1 is a diagrammatic elevational view of an eddy-current and hysteresis brake attached to a non-resiliently mounted part of the vehicle above the track.

Referring now to the drawings wherein the drawings are for the purposes illustrating preferred embodiments of the invention and not for the purposes of limiting same, FIG. 1 shows a diagrammatic lateral view of an eddy-current and hysteresis brake 1 wherein the one half A is illustrated in switched-off position and the other half B in switched-on position.

In this embodiment, the brake 1 has been fastened to a non-resiliently mounted part of a truck 2; e.g., to a carrier body 3 joined with bearing blocks 4. The brake 1 includes a casing 5 (shown partly cut open) having guide rods 6 fastened thereto which are movable in a vertical direction in bores 7 of the carrier body. On the upper part of the guide rod 6 protruding above the carrier body, a coil spring 8 is provided, the lower end of which is supported by the carrier body and the upper end by a spring housing 9 fastened to the upper part of the guiding rod.

In switched-off position (Illustration A), the distance between the brake 1 and the track 10 is large, and is due to the effect of the coil spring, so that the brake and its casing are adjacent to the carrier body 3.

When the brake is electrically energized to stop the track-bound vehicle, a magnetic attraction is produced between the pole surfaces 11 and the track, overcoming the effect of the coil spring and pulling the brake into working position (Illustration B). In this design, the spring box also serves as a spacing device, as the lower surface 12 of the spring box is supported on the carrier body 3 so that a uniform working air gap 21 is maintained. To make sure that the brake will lower when it is energized, the distance between the pole surfaces 11 and the tread of the track 13, and the strength of the counterforce of the spring coil in switched-off position of the brake must, of course, be critically arranged so that sufficient attraction forces are available even at high vehicle speeds.

To avoid any damage to the pole surfaces during braking when passing over uneven surfaces, the ends of the brake have been provided with wear-resisting skids 14, a wear-resisting sliding surface 24 of which protrudes vertically downwardly from the pole surfaces.

Figure 2:
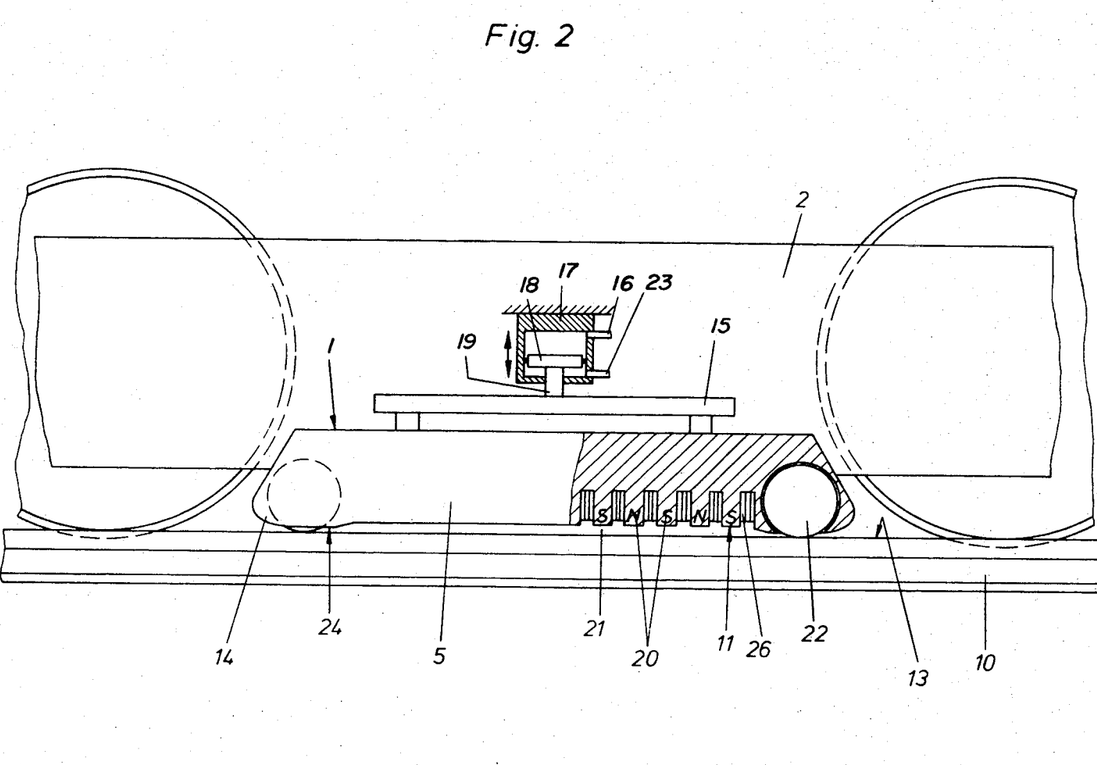
FIG. 2 is a diagrammatic elevational view of an eddy-current and hysteresis brake being movable in the vertical direction, and attached to the spring-mounted part of the vehicle above the track.

In the embodiment shown in FIG. 2, the eddy-current and hysteresis brake 1, according to the invention, have been fastened to a resiliently-mounted part of the vehicle 2 by means of rods 15 which can be moved in a vertical direction and hence vertically adjust the pole surfaces 11 of the brake facing the tread 13 of the track. The vertical displacement in the direction marked by the arrows in FIG. 2 is effected by compressed air or other suitable fluid-actuating media penetrating through the indicated pressure pipe 16 into a compressed air cylinder 17 and influencing the piston 18 which by means of a piston rod 19 has been connected with the rods 15.

In FIG. 2, the brake has been lowered; i.e., it is in switched-on position. In order to maintain a constant working air gap 21 between the pole surfaces 11 of the pole branches 20 and the tread 13 of the track at the ends of the brake, supporting wheels 22 have been provided which roll on the track. Apart from the supporting wheels, the ends of the brake are provided with skids 14 made of wear-resisting material. The sliding surface 24 of these skids stands back with respect to the treads of the supporting wheels 22, but stands out with respect to surfaces 11 of the pole branches 20. When the tread of the track is even, the wear-resisting skids are protected, because the supporting wheels maintain a constant or uniform air gap. In case of unevennesses; when the vehicle passes turnouts or joints and the supporting wheels can get into hollows, the sliding surface of the wear-resisting skids slides on the track, so that damage or wear to the pole surfaces is avoided.

When the braking process is finished, the brake is lifted from the track by compressed air acting through the pressure pipe 23 into the compressed air cylinder 17, thus moving the piston 18.

In the embodiment of the brake with supporting wheels and wear-resisting skids according to FIG. 2, the working air gap can be smaller than that of the embodiment according to FIG. 1, so that this brake can be operated with a lower excitation output.

The brake has been provided with a casing 5, which is shown cut open in the drawing so that the individual pole branches 20 of the magnetic system can be seen.

Figure 3:
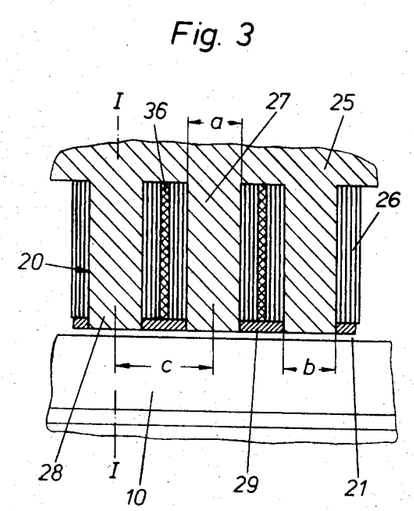
FIG. 3 is an enlarged partial view of the magnetic system in longitudinal section.
Figure 4:
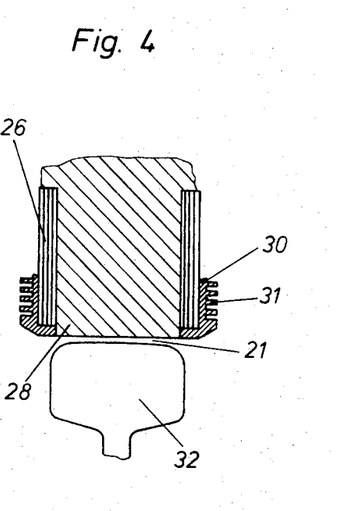
FIG. 4 is a cross section of the magnetic system of FIG. 3 along the line I—I of FIG. 3.
Figure 5:
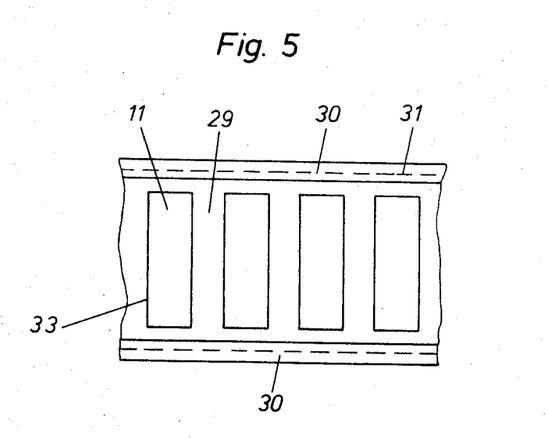
FIG. 5 is a bottom plan view of the magnet system.
Figure 6:
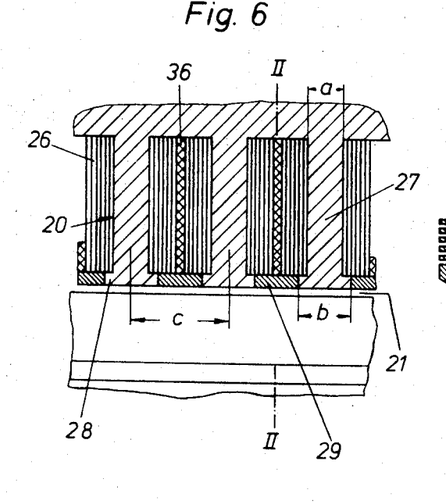
FIG. 6 is an enlarged view of the magnetic system in longitudinal section, illustrating a modified design of the pole branches of the iron core.
Figure 7:
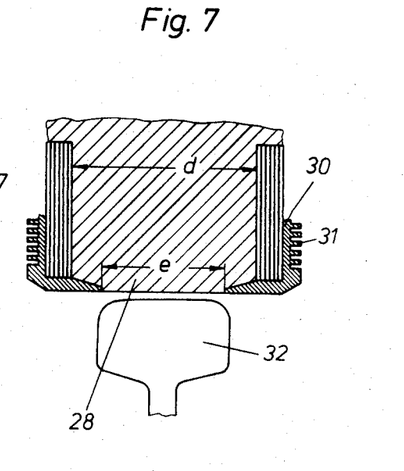
FIG. 7 is a cross section of the magnetic system of FIG. 6 along the line II—II of FIG. 6.

The design of the magnetic system can be seen more clearly from FIGS. 3 to 7, wherein FIGS. 3 to 5 show one embodiment of the magnetic system and FIGS. 6 and 7 another.

FIG. 3 shows an enlarged partial view of the magnetic system in longitudinal section, which faces the track 10 with an intermediate air gap 21. The magnetic system is composed of individual pole branches 20 joined by a yoke 25. The energizing winding 26 has been attached to the pole branches which windings 26 preferably are designed as strip windings, the direction of winding being so that when the winding is energized, poles of alternating polarity are produced in the individual branches. The windings of the individual pole branches are separated from each other by an isolating layer 36.

Each pole branch is composed of a part 27 surrounded by the winding and the pole head 28 protruding from the winding. Preferably, the part 27 and the pole head 28 are made of one piece. The pole heads have been embedded and possible welded or soldered into a plate 29 made of non-magnetic metal material; e.g., an alloy of 0.06% C, 0.4% Si, 18% Mn, 13% Cr, 2.2% Ni and the remaining percentage Fe, so that the part of the brake facing the track forms a plane or smooth surface. The thickness (a) of the part 27 of the pole branch surrounded by the winding shall, measured in the direction of motion, at most be equal to the thickness (b) of the pole head 28, and the distance from center to center (c) of two neighboring pole branches shall be 45 mm ± 15 mm, whereby the thickness (b) of a pole head measured in the direction of motion is at least 16 mm.

In the present embodiment of the invention, the thickness (a) of the part 27 of the pole branch surrounded by, the winding is equal to the thickness (b) of the pole head.

FIG. 4 shows a cross section of the magnetic system along the line 1—1 of FIG. 3. For dissipating the resulting heat, a cooling body 30 has been provided with cooling ribs 31. In this illustration, the upper part of the track is marked with numeral 32.

The cross section of the pole heads 28 through which the magnetic flux passes shall be so big that it amounts to more than 25 percent, preferably between 35 and 40 percent of the cross section of the upper part of the track. Because of the size relationship of the pole heads 28, the lines of magnetic force penetrate relatively deeply into the upper part of the track, especially in case of low speeds so that even in the lower range of speed, the braking force is extremely good.

FIG. 5 shows a view of the magnetic system from below. The plate 29 made of non-magnetic material is provided with a plurality of recesses 33, in which the pole heads 28 are embedded so that their pole surfaces 11 form one plane together with the plate. Moreover, the cooling bodies 30 carrying the cooling ribs 31 can be seen.

FIG. 6 shows another embodiment of the magnetic system. In order to achieve a large space for the windings, the core portion 27 of the pole branch 20, in the direction of motion, is thinner than the pole head 28; i.e., the dimension (a) is smaller than the dimension (b). In order that the cross section of the core portion 27 penetrated by the magnetic flux is at least equal to the cross section of the pole head, the core portion 27 surrounded by the winding is made wider than the pole head 28, measured vertically to the direction of motion, as it can be seen from FIG. 7. The width of the part of the core portion surrounded by the winding has been marked with (d), while the width of the pole head has been marked with (e). The result is that the cross section (a) (d) of the core portion 27 through which the magnetic flux passes is at least equal to the cross section (b) (e) of the pole head through which the same magnetic flux passes. In this embodiment, also, the pole heads are embedded in a plate 29 made of non-magnetic material which includes appropriate cooling fins 31.

Figure 8:
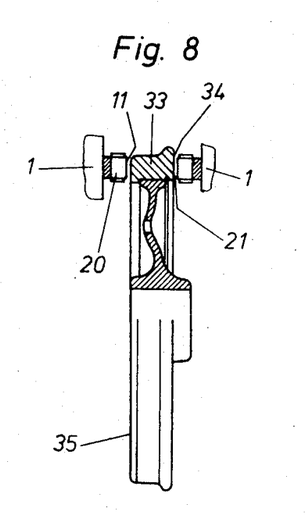
FIG. 8 is a partially-cut lateral view of a vehicle wheel, wherein the two front surfaces of the wheel flange opposing each other are influenced by appropriate eddy-current and hysteresis brakes.

For braking the track-bound vehicle, it is also possible for the eddy-current and hysteresis brake according to the invention to act on the wheel flanges 35, as shown in FIG. 8. In this embodiment of the invention, the eddy current brakes 1 are arranged on both sides of the wheel flange 33 such that the pole surfaces 11 of the pole branches 20 face the front surfaces 34 of the wheel flange with an intermediate air gap 21. Here, the attractive forces cancel each other out.

Figure 9:
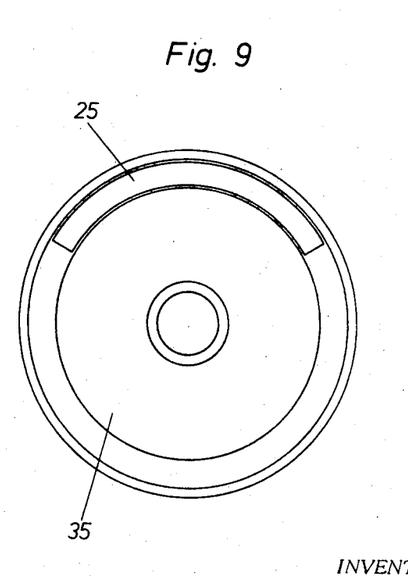
FIG. 9 is an elevational view of the vehicle wheel with eddy-current and hysteresis brakes of ring segment shape.

As can be seen from FIG. 9, the yoke 25 joining the pole branches is of ring segment shape, and has the same radius as the wheel flange. In this embodiment of the invention, the eddy-current brakes can also be fastened to the resiliently-mounted parts of the vehicle frame with a relatively small air gap.

It is also possible to arrange the brakes on both sides of the wheel flange in a way that their pole surfaces face the treads of the tires attached to the wheel flanges.

The embodiment of the invention shown in FIG. 9 as adapted to a wheel flange could also apply to the rail itself if the rail were of such design that it would not include anything at crossings or switches to interfere with the side mounted pole surfaces.

The embodiment of the invention shown in FIG. 9 also allows eddy-current and hysteresis brakes to act on vented brake discs which are fastened on the wheel axle and rotate with it.

Figure 10:
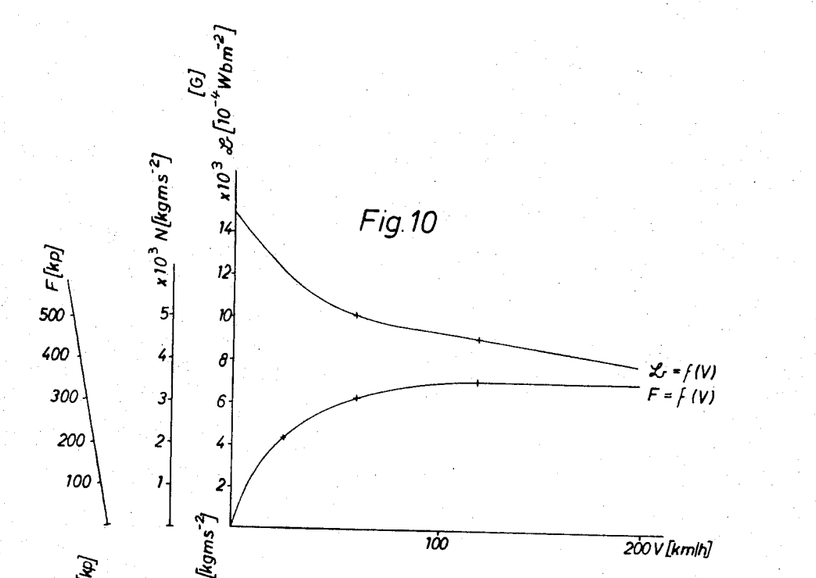
FIG. 10 is a diagram showing the braking force and the induction as a function of the speed for an overall length of the brake of 1 m.

As can be seen from the diagram shown in FIG. 10, a brake according to the invention having an overall length of 1 m produces a braking force of some 300 kp $\triangleq$ 2,943 kgms$^{-2}$ at a speed of 60 km/h. As is obvious from the bottom curve representing "braking force as a function of speed," the braking force still increases slightly and then remains constant over a speed range up to more than 200 km/h, although the induction considerably decreases, as can be seen from the top curve representing "induction as a function of speed."

These values were obtained during a braking test with the brake according to the invention.

The decreases of the induction is due to the fact that as the speed of the vehicle increases, magnetic fields are produced in the track by the eddy currents resulting from the increased speed, the strength of which increases up to a certain vehicle speed and which fields oppose the electromagnetically-produced fields of the brake caused by armature reaction. On the other hand, in case of low-vehicle speeds, the electromagnetically-energized poles of the brake act on the track with considerable attractive forces because of the high induction so that a high bearing load can occur.

Figure 11:
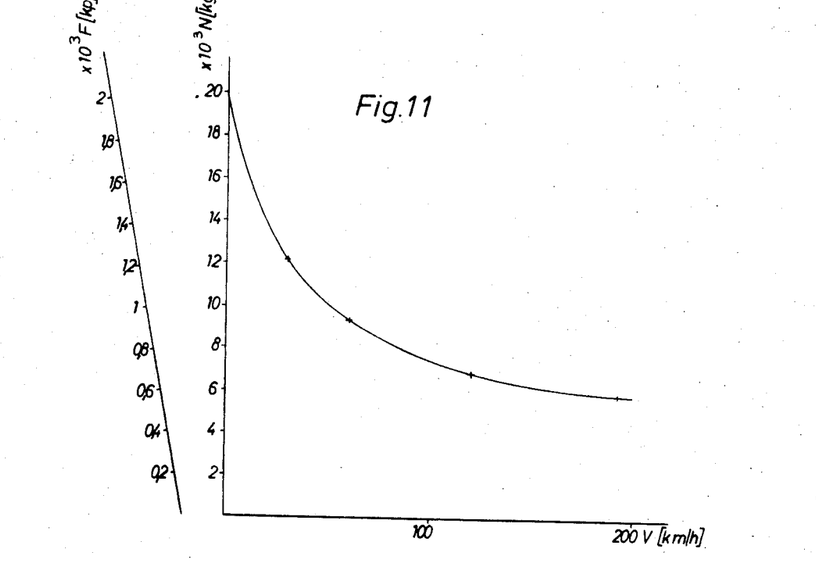
FIG. 11 is a diagram showing the attraction influencing the track as a function of the speed for an overall length of the brake of 1 m.

The diagram shown in FIG. 11 (measured values) indicates the attraction influencing the track as a function of the speed for an overall brake length of 1 m. From this diagram it is obvious that the brake, in case of a vehicle speed of some 50 km/h, acts on the track with an attractive force of 1,000 kp = 9,810 kgms$^{-2}$. For this reason, control and/or cutout means have been provided by which the energizing current; e.g., originating from an AC or three-phase current generator driven by the wheels of the track-bound vehicles, depending on frequency, and rectified by means of rectifiers, is controlled in a way that in case of reduced driving speed, the occurring attraction does not surpass the allowable bearing load. A generator with mechanically controlled actuation such as shown in my co-pending application, Ser. No. 853,764 which is now abandoned in favor of continuation application Ser. No. 153,785 filed June 16, 1971, would be quite suitable for this purpose. Such a generator uses two pole rings arranged at some distance from each other forming the stator whereby the energizing current can be adjusted by moving one pole pitch relative to the other. With a generator of this type, the brake can be controlled, respectively switched on or off; e.g., from the driver's seat by means of compressed air, whereby the compressed air piston influences known electric switching elements.

Figure 12:
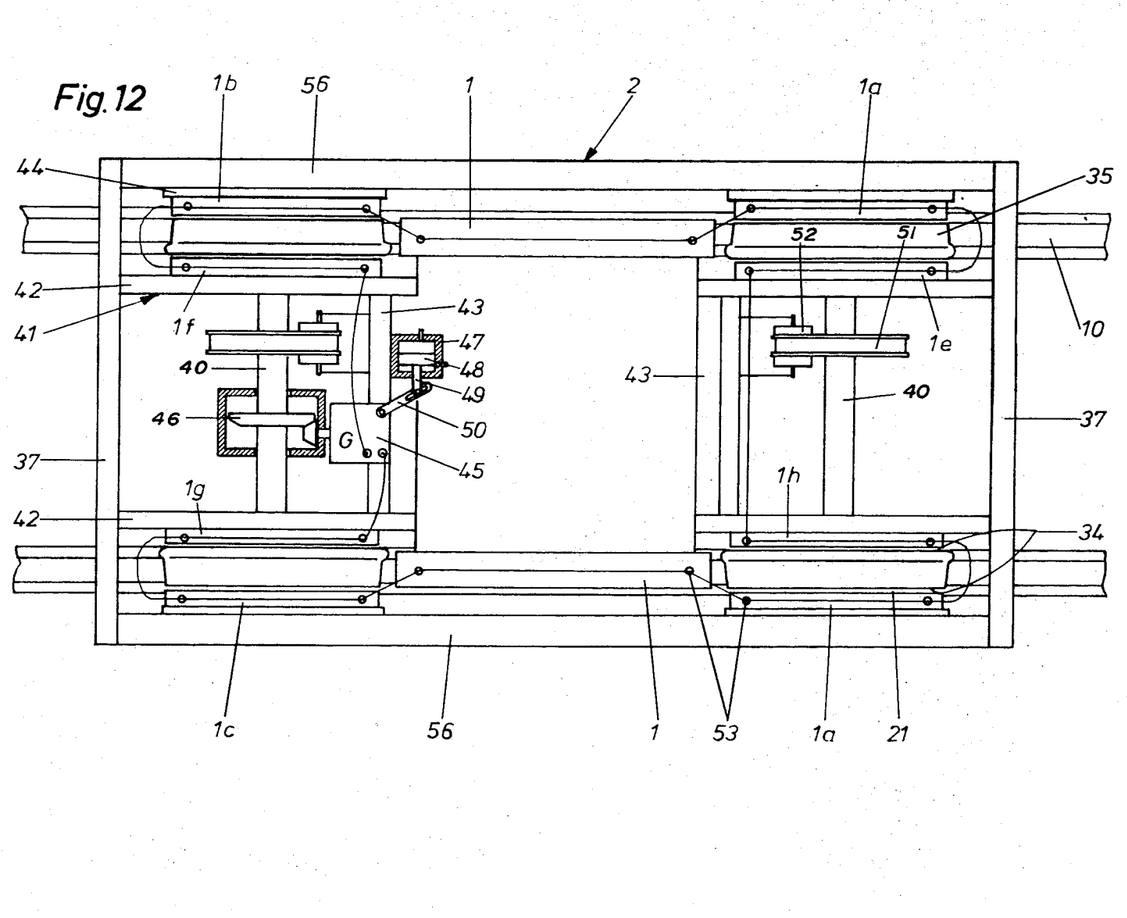
FIG. 12 is a plan view of a truck of a track-bound vehicle being provided with several brakes according to the invention.

The truck 2 shown schematically in FIG. 12 consists of the truck frame which is composed of the two lateral struts 56 and the two front struts 37. In the lateral struts 56 there is housed the axle bearing 38 (see FIG. 13), consisting of the bearing block 4 and the bearing guide 39, which cushions the truck against the wheel axles 40. Furthermore, the truck is provided with a supporting frame 41 which consists of the longitudinal struts 42 and the transverse strut 43.

Figure 13:
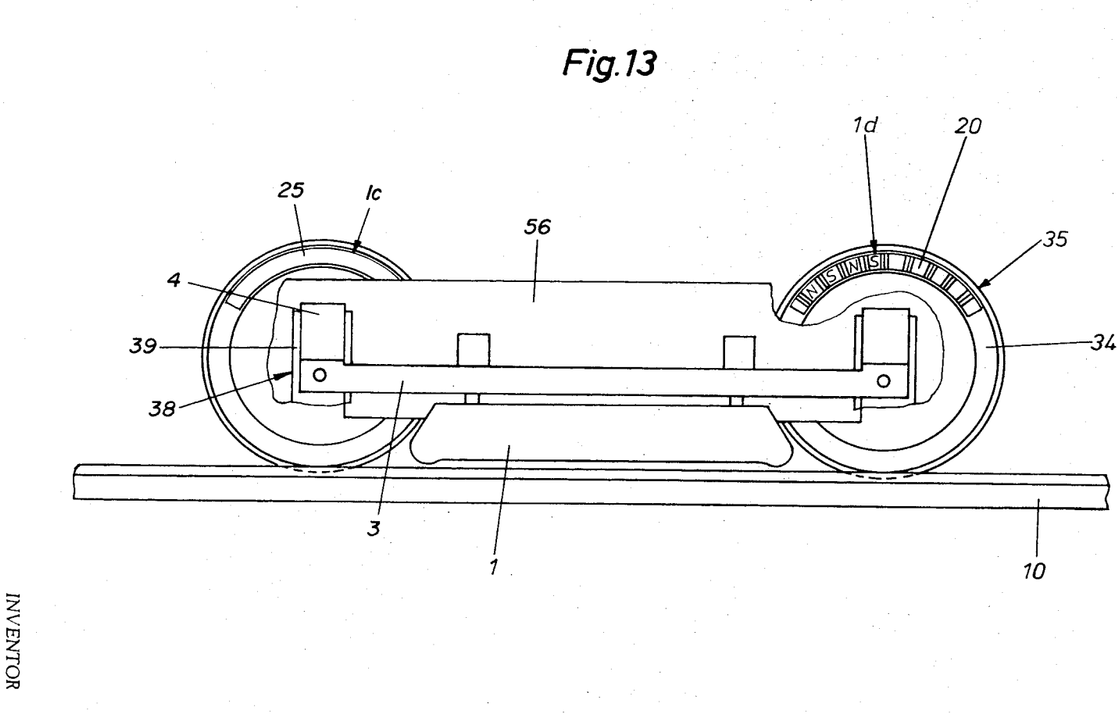
FIG. 13 is a side view of the truck shown in FIG. 12 in partial section.

It can be better recognized from FIG. 13 that eddy-current and hysteresis brakes 1 are arranged between the running wheels 35 which act upon the rails 10. The brakes 1 are fastened to the non-resiliently mounted carrier body 3 joined with bearing blocks 4, as described already in FIG. 1 and illustrated accordingly.

Moreover, two eddy-current and hysteresis brakes facing each other are arranged on either side of each running wheel 35. As can be seen from FIGS. 8, 9 and 13, the brakes consist of a ring segment shaped yoke 25 joining the individual pole branches 20. The various ring segment shaped eddy-current and hysteresis brakes are marked 1a through 1h in FIG. 12.

Brakes 1a to d are firmly mounted on fastening plates 44 which are connected with the lateral struts 56 of the truck frame. The ring segment shaped brakes 1e to h are fastened on the longitudinal struts 42 of the supporting frame 41.

As can be seen from FIG. 12, the working air gap 21 is found between the front surfaces 34 of the wheel flange and the pole surfaces of the brakes 1a to h. Due to the opposite arrangement on both sides of the wheel, the attractions exercised on the wheels by means of the brakes neutralize each other.

This arrangement enables the positioning of up to 10 brakes in one truck whereby eight of said brakes act upon the wheels and two upon the tread of the track.

For generating the energizing current, an exciting dynamo 45 is provided which is driven by the wheel axle 40 via a bevel gear 46.

As is shown in FIG. 12, all brakes are connected in series. It is also possible to connect part of them in series and part in parallel; i.e., a so-called group connection. The terminal plugs are marked 53. The stator of the generator producing the energizing current is composed of two pole rings which can be turned relative to each other as described in U.S. Pat. application Ser. No. 853,764 which is now abandoned in favor of continuation application Ser. No. 153,785 filed June 16, 1971. In the present example, the pole ring is turned or twisted by means of compressed air. For this purpose, a compressed air cylinder 47 with a piston 48 is mounted on the transverse strut 43, whereby the piston rod 49 is connected with rods 50 for turning the pole ring or rings.

For braking up to a standstill, friction brakes are provided which may, for instance, consist of friction discs 51 being fixed on the wheel axles 40 and acted upon by brake blocks 52.

Further, the invention contemplates that the generator of application Ser. No. 853,764 which is now abandoned in favor of continuation application Ser. No. 153,785 filed June 16, 1971, can be used to maintain the induced energizing current automatically at a constant value. Since induced currents are aligned according to the Lenz principle, they tend to impede the motion of the conductors due to the interaction existing between the current-carrying conductors and the magnet. This principle can be used in the generator by connecting one of the two torsional pole rings of the stator with a means generating a counter force, such as a spring. Hence, when the energizing current increases, it will attempt (according to the Lenz principle) to move this particular pole ring against the force of the spring. Some movement by a certain angular amount will occur which however causes a reduction of the induced current because the poles are angular displaced from each other. A state of equilibrium is reached which essentially corresponds to the force of the spring, and in this way, the energizing current will not exceed a certain predetermined peak value. In this way, it is possible to provide an automatic control of the energizing current up to a predetermined maximum value.

For bringing the vehicle to a standstill and for parking, it is advisable to use a friction brake, which is then only subject to small wear so that the maintenance costs can be considerably reduced.

Figure 14:
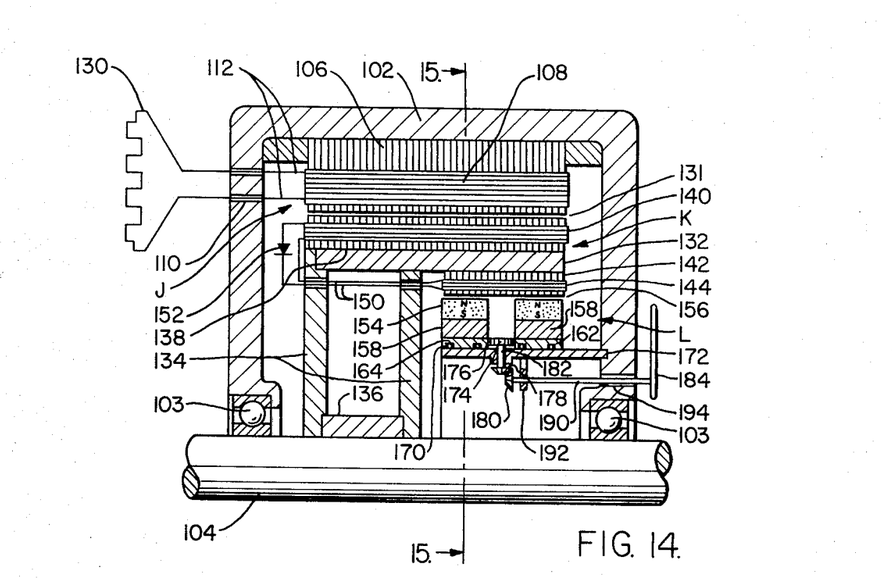
FIG. 14 is a cross-sectional elevation view showing an exciting dynamo which may be used for controlling energization of the eddy current and hysteresis brake of the present application.
Figure 15:
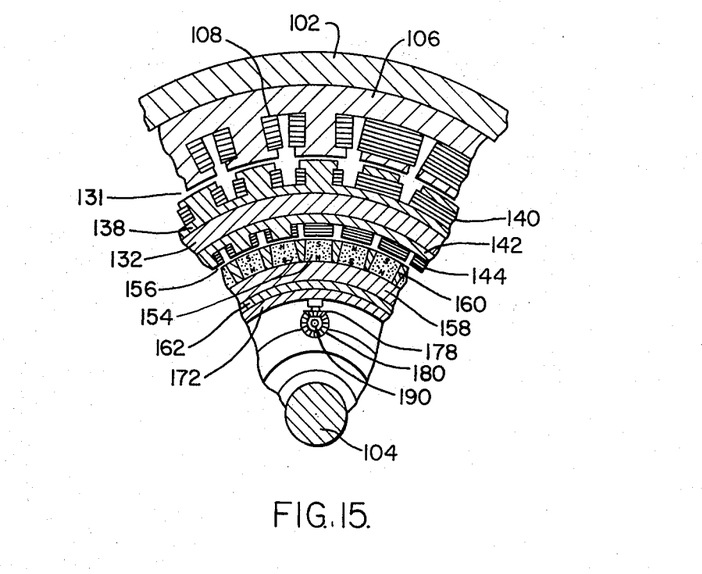
FIG. 15 is a partial cross-sectional elevational view looking generally in the direction of arrows 15—15 of FIG. 14.

One arrangement for controlling energization of coils 26 is shown with reference to FIGS. 14 and 15. A stationary casing 102 is supported by bearings 103 on the shaft 104 which is driven through level gear 46 by wheel axle 40. Induction body J has been arranged inside the casing 102, and is comprised of a pole ring 106 made of laminated sheets, which carries coil windings 108. Both ends of each coil winding have been guided out of the casing 102 through openings 110 therein by leads 112 which are connected to a conductor of high resistance 130. The inductor body K, which is separated from the induction body J by an air gap 131, is fastened to the shaft 104 which rotates therewith. The inductor body K includes a pole wheel mounting cylinder 132, which is maintained in a concentric position relative to the shaft 104 by support members 134 that may take a variety of forms, such as spokes or discs. The support members 134 are maintained in spaced-apart relationship by a spacer tube 136. A pole wheel 138 made of laminated sheets carries an exciting winding 140 and is secured to the exterior circumference of the mounting cylinder 132.

In order to excite the exciting winding 140 of the inductor body K, there is provided an exciting dynamo L which is disposed within the inductor body. The exciting dynamo includes a rotor comprised of laminated, ring-shaped pole sheets 142 which are fastened to the interior circumference of the mounting cylinder 132 and an induction winding 144, in which the exciting current is generated, secured to the poles of the pole sheets. The induction windings 144 are connected to the exciting windings 140 of the inductor body K by leads 150 which include an intermediate rectifier 152. In view of this arrangement, the induction windings 144 of the exciting dynamo L rotate together with the exciting windings 140 of the inductor body K and thus require no movable current transmitters, such as sliprings or brushes, which might affect the safe and efficient operation of the induction brake or clutch.

The exciting dynamo L is energized by a stator having permanent magnets 154 spaced apart from the induction windings 144 by an air gap 156. The current produced by the exciting dynamo L is adjustable. For this purpose ferromagnetic pole rings 158 are provided. Secured to the circumference of the pole rings 158 is a retainer 160 made of diamagnetic material in which is embedded the permanent magnets 154. Secured to the bottom of each pole ring 158 is a base plate 162 having slots 164 therein and in which has been disposed bearings 170. The base plates 162 are movably supported on a carrier cylinder 172 which is secured to the casing 96. The interior edges of the base plates 162 have been provided with toothing 174 and a toothed wheel 176 is disposed therebetween and in driving engagement therewith. Bevel wheels 178, 180, which are at right angles to each other, are provided below the carrier cylinder 172; bevel wheel 178 being in driving engagement with the toothed wheel 176 by means of a shaft 182 and bevel wheel 180 being in driving engagement with an operating lever 184 by means of a shaft 190 which is supported by a bearing block 192 and passes through an opening 194 in the casing 96.

In order to switch the exciting current on or off, the two pole rings 158 can be turned relative to each other by up to one pole pitch; the rotor and stator of the exciting dynamo L having the same pole pitch separation (as illustrated in FIG. 15). This is accomplished by rotating the operating lever 184 which relatively displaces the pole rings 158 through the above-described drive system. By employing appropriate stops (not illustrated), the relative movement of the pole rings 158 can be limited to a displacement of only one pole pitch. By adjusting the exciting current generated by the exciting dynamo L from zero to the maximum, it is possible to accurately control the amount of braking torque.

It will be recognized that leads 150 from generator L may be connected through slip rings with coils 26 for varying the energization of the coils.

While in accordance with the patent statutes only the best and known embodiments of the invention have been illustrated and described in detail, it is to be understood that the invention is not limited thereto or thereby, but that the inventive scope is defined in the appended claims.

What is claimed is:

1. An eddy-current and hysteresis brake system for a track-bound vehicle having a magnetic system including iron core means having a plurality of spaced-apart pole branches joined by a yoke, energizing coil means surrounding each of said pole branches, each of said pole branches including a coil surrounded portion and a pole head portion projecting out from said coil means, said vehicle having a predetermined direction of motion, said coil surrounded portion on each of said pole branches having a thickness measured in said direction of motion which is not greater than the thickness of said pole head portion on each of said pole branches measured in said predetermined direction, said brake system including parts in which eddy currents and hysteresis work is produced and said pole heads having pole surfaces facing said parts, spacing means for maintaining a substantially constant air gap between said pole surfaces and said parts, said vehicle including wheels defining said parts in which eddy currents and hysteresis work are produced, said wheels including wheel flanges having front surfaces, said pole surfaces facing said front surfaces, and said yoke being of ring segment shape.

2. An eddy-current and hysteresis brake system for a track-bound vehicle having a magnetic system including an iron core having a plurality of spaced-apart pole branches joined by a yoke, energizing coil means surrounding each of said pole branches, each of said pole branches including a coil surrounded portion and a pole head portion projecting out from said coil means, said vehicle having a predetermined direction of motion, said coil surrounded portion on each of said pole branches having a thickness measured in said direction of motion which is not greater than the thickness of said pole head portion on each of said pole branches measured in said predetermined direction, said brake system including parts in which eddy currents and hysteresis work is produced and said pole heads having pole surfaces facing said parts, spacing means for maintaining a substantially constant air gap between said pole surfaces and said parts, said vehicle including wheels defining said parts in which eddy currents and hysteresis work are produced, said wheels including wheel flanges having opposite sides, wheel tires having treads secured to said flanges, said yoke being of ring segment shape, said magnetic system including a plurality of said iron core means positioned on said opposite sides of said wheel flange with said pole surfaces thereof facing said tire tread.

3. An eddy-current and hysteresis brake system for a track-bound vehicle having a magnetic system including an iron core having a plurality of spaced-apart pole branches joined by a yoke, energizing coil means surrounding each of said pole branches, each of said pole branches including a coil surrounded portion and a pole head portion projecting out from said coil means, said vehicle having a predetermined direction of motion, said coil surrounded portion on each of said pole branches having a thickness measured in said direction of motion which is not greater than the thickness of said pole head portion on each of said pole branches measured in said predetermined direction, said brake system including parts in which eddy currents and hysteresis work is produced and said pole heads having pole surfaces facing said parts, spacing means for maintaining a substantially constant air gap between said pole surfaces and said parts, said parts being defined by track means on which said vehicle travels, said spacing means including carrier means for said iron core means, supporting wheels rotatably mounted on said carrier means and having peripheral surfaces projecting beyond said pole surfaces toward said track means, and wear-resisting skid surfaces on said carrier means positioned intermediate said pole surfaces and said peripheral surfaces of said wheels.

4. An eddy current and hysteresis brake system for vehicles comprising; iron core means including a plurality of individual pole branches spaced-apart in a predetermined direction and joined together by yoke means, an energizing coil surrounding a portion of each of said pole branches, each of said pole branches including a coil surrounded portion and a pole head portion projecting from said coil, each of said pole head portions having a pole surface, said coil surrounded portions having a thickness measured in said predetermined direction which is not greater than the thickness of said pole head portions measured in said predetermined direction, said pole branches having a center-to-center spacing in said predetermined direction at said pole surfaces of between thirty and sixty millimeters, and said pole head portions and said pole surfaces having a thickness measured in said predetermined direction of at least sixteen millimeters.

5. The brake system of claim 4 wherein said predetermined direction extends along the circumference of a circle and said yoke comprises a ring segment.

6. The brake system of claim 4 wherein said pole head portions and said pole surfaces have a thickness measured in said predetermined direction which is greater than said thickness of said coil surrounded portions measured in said predetermined direction, said coil surrounded portions having a thickness as measured in a second direction perpendicular to said predetermined direction and parallel to said pole surfaces which is greater than the thickness of said pole heads and pole surfaces as measured in said second direction so that the cross-sectional area of said coil surrounded portions is substantially equal to the cross-sectional area of said pole heads and pole surfaces.

7. The brake system of claim 4 and further including generator means for energizing said coils, said generator means including a pair of axially-spaced stator pole rings having circumferential surfaces, a plurality of magnetic poles of alternating polarity circumferentially arranged on said circumferential surfaces, and adjustment means for rotatably adjusting said rings relative to one another up to one pole pitch for varying the energization of said coils.

8. The brake system of claim 4 and further including electrical energizing means for energizing said coils, and control means for controlling said electrical energizing means to vary the magnetic field produced in said pole heads.

9. The brake system of claim 4 wherein said vehicle has a plurality of wheels and rides on track means, at least one of said iron cores being positioned adjacent each of said wheels and said track means for producing eddy current and hysteresis braking in all of said wheels and said track means.

10. The system of claim 9 and further including variable energization means for energizing said coils.

11. An eddy current and hysteresis brake system for vehicles comprising; iron core means including a plurality of individual pole branches spaced-apart in a predetermined direction and joined together by yoke means, an energizing coil surrounding a portion of each of said pole branches, each of said pole branches including a coil surrounded portion and a pole head portion projecting from said coil, each of said pole head portions having a pole surface, said pole head portions and pole surfaces having a thickness measured in said predetermined direction which is greater than the thickness of said coil surrounded portions measured in said predetermined direction, and said coil surrounded portions having a thickness as measured in a second direction perpendicular to said predetermined direction and parallel to said pole surfaces which is greater than the thickness of said pole head portions and pole surfaces as measured in said second direction so that the cross-sectional area of said coil surrounded portions is substantially equal to the cross-sectional area of said pole head portions and pole surfaces.

12. An eddy current and hysteresis brake system for vehicles movable in a predetermined direction on track means having a track surface comprising; iron core means including a plurality of individual pole branches spaced-apart in said predetermined direction and joined together by yoke means, an energizing coil surrounding a portion of each of said pole branches, each of said pole branches including a coil surrounded portion and a pole head portion projecting from said coil, said pole head portions having pole surfaces facing said track surface, carrier means for carrying said iron core on said vehicle, said carrier means having wear-resistant skid surfaces facing said track surface and positioned between said track surface and said pole surfaces, supporting wheels on said carrier means for supporting said carrier means on said track surface with said skid surfaces normally spaced from said track surface.

* * * * *

UNITED STATES PATENT OFFICE
CERTIFICATE OF CORRECTION

Patent No. 3,723,795            Dated March 27, 1973

Inventor(s)    MAX BAERMANN

It is certified that error appears in the above-identified patent and that said Letters Patent are hereby corrected as shown below:

Claims priority, application Germany, filed July 18, 1970,

Serial No. P 20 35 781.7

Signed and sealed this 16th day of April 1974.

(SEAL)
Attest:

EDWARD M. FLETCHER, JR.
Attesting Officer

C. MARSHALL DANN
Commissioner of Patents